US006855429B2

(12) United States Patent
Stay

(10) Patent No.: US 6,855,429 B2
(45) Date of Patent: Feb. 15, 2005

(54) METHOD AND COMPOSITION FOR ELECTROSTATIC COATING, AND ARTICLES MADE THEREFROM

(75) Inventor: Kevin E. Stay, West Salem, WI (US)

(73) Assignee: Mathew McPherson, Norwalk, WI (US)

( * ) Notice: Subject to any disclaimer, the term of this patent is extended or adjusted under 35 U.S.C. 154(b) by 4 days.

(21) Appl. No.: 10/442,699

(22) Filed: May 21, 2003

(65) Prior Publication Data

US 2003/0211344 A1 Nov. 13, 2003

Related U.S. Application Data

(62) Division of application No. 09/953,014, filed on Sep. 13, 2001, now Pat. No. 6,620,463.

(51) Int. Cl.[7] .......................... B05D 5/12; B32B 27/28; B32B 33/00

(52) U.S. Cl. .................... 428/411.1; 428/420; 427/470; 427/472

(58) Field of Search ............................. 428/411.1, 420, 428/935; 427/470, 472

(56) References Cited

U.S. PATENT DOCUMENTS 3,236,679 A 2/1966 Bobalek et al.
4,013,804 A 3/1977 Gruetzman .................. 427/33
4,206,204 A 6/1980 Langford .................... 424/150
4,600,598 A 7/1986 Nelson et al. ................ 427/27
4,861,663 A 8/1989 Sirinyan et al. ............ 428/409
4,894,241 A 1/1990 Chakrabarti et al. ........ 424/672
4,978,399 A 12/1990 Kodama et al. ............ 148/250
5,219,493 A 6/1993 Seshadri ..................... 252/500
5,707,955 A 1/1998 Gomes et al. .............. 510/421
5,830,541 A 11/1998 Carswell et al. ............ 427/475
5,962,546 A 10/1999 Everaerts et al. ............. 522/25
6,001,207 A 12/1999 Enlow et al. ............... 156/230
6,129,948 A 10/2000 Plummer et al. ........... 427/202
6,133,344 A 10/2000 Blatter et al. ............... 523/221
6,174,427 B1 1/2001 Lundgard ................... 205/158
6,254,751 B1 7/2001 Reiter et al. ................ 204/487
6,270,853 B1 8/2001 Brown et al.

FOREIGN PATENT DOCUMENTS

EP 0 418 066 3/1991
GB 1 099 713 1/1968

*Primary Examiner*—Deborah Jones
*Assistant Examiner*—Jason Savage
(74) *Attorney, Agent, or Firm*—Vidas, Arrett & Steinkraus

(57) ABSTRACT

An improved method of pretreating and electrostatically coating an article made of a material which has little or no conductivity, and the article made therefrom.

15 Claims, No Drawings

METHOD AND COMPOSITION FOR ELECTROSTATIC COATING, AND ARTICLES MADE THEREFROM

CROSS-REFERENCE TO RELATED APPLICATIONS

This application is a divisional application of U.S. application Ser. No. 09/953,014, filed on Sep. 13, 2001 now U.S. Pat. No. 6,620,463 the entire content of which is by reference herein in its entirety.

FIELD OF THE INVENTION

The present invention relates to an improved method of electrostatically coating substrates which are made of polymers, polymer composites, or other electrically non-conductive materials.

BACKGROUND OF THE INVENTION

The use of electrostatic powder coating techniques to paint electrically conductive substrates, such as metals, is well known and successfully employed. Using this method, a powder coating material is statically charged or ionized to a positive polarity or negative polarity, and then sprayed or blown onto a grounded, conductive article to which it adheres. The electrostatic attraction between the paint and the grounded article results in a more efficient painting process with less wasted material, and a thicker, more consistent paint coverage, particularly on articles that have a complex shape. Once coated, the article is then baked. In electrostatic painting, a powder coating material is statically charged and applied using standard powder coating equipment. With electrically conductive substrates, a static electric potential is generated between the paint and the substrate to be painted resulting in an attraction of the paint to the object.

When articles fabricated from metals are painted, the metal, which is inherently conductive, is easily grounded and efficiently painted.

However, in recent years, there has been an emphasis on the use of polymeric materials in the manufacture of articles, particularly in applications requiring reductions in weight and improved corrosion resistance, such as automotive applications. However, polymers typically used in such processes are insufficiently conductive to efficiently obtain satisfactory paint thickness and coverage when the article is electrostatically painted.

On poor electrical conductors such as polymeric materials, the conventional electrostatic coating techniques are not as successful because an electric charge potential must exist between both the substrate and the paint. If an object has poor electrical conductivity, it cannot be efficiently electrostatically charged and cannot, therefore, be efficiently electrostatically painted. Furthermore, on non-conductive surfaces, low humidity levels can have a negative impact on the quality of the bond of the powder coating to the surface.

Even so, electrostatic painting techniques are still desirable for use due to the benefits, especially for large scale commercial operations, including less loss of paint than with the use of other painting techniques such as spraying a liquid paint, and the quality of the coating is quite good because the method allows for a uniform distribution of paint without the entire surface being easily accessible. Materials having little or no conductivity such as plastics, may first be coated with a conductive primer or "prep" coating, and then electrostatically painted.

Some specific examples of methods of applying an electrostatic charge to surface having little or no conductivity include the addition of conductive fillers to polymers, for instance, application of a conductive primer such as a quaternary amine, However, the conductivity from these treatments, as well as the physical and/or surface characteristics may be less than desirable for certain applications.

The use of conductive primer compositions to prime the article in order to increase its conductivity is also known. However, depending on the particular primer employed, the cured primer may have adhesion, surface smoothness, hydrolytic stability, and durability characteristics, which are less than desirable for a particular application. Additionally, such primers compositions may contain volatile organic solvents, the emission of which during the priming process may be undesirable, as well as environmentally unfriendly. Further, each of the treatments described above can be expensive.

SUMMARY OF THE INVENTION

The present invention relates to an improved surface treatment for inducing conductivity in a substrate which has little or no conductivity which includes at least one halogen or halogen complex.

The present invention further relates to a method of treating a substantially non-conductive surface to improve the adhesion of an electrostatic powder coating to the surface. The method involves application of a surface treatment composition which includes a halogen, halogen complex, or hypohalite to the surface of a substrate. In some embodiments, the surface treatment composition includes iodine or iodine complex. In other embodiments, the surface treatment composition includes sodium hypochlorite, or bleach.

More specifically, the present invention relates to a method of electrostatically coating substrates having poor electrical conductivity including the steps of priming the substrate by applying a surface treatment composition which includes at least one halogen, halogen complex, or hypohalite induce conductivity in an otherwise substantially nonconductive material, applying a charge to the surface treated substrate, and electrostatically coating the substrate. In some particular embodiments, the halide is iodine. In some embodiments, the substrate comprises at least one polymeric material.

The present invention further relates to articles electrostatically coated according to the present invention. In some embodiments, the articles comprise at least one polymeric material.

The process of the present invention finds utility for use on any article that may be electrostatically coated or painted. For example, articles for the automotive industry, appliances, equipment parts and machine components, furniture, articles for outdoor activities including hunting, fishing and camping, and so forth. The process of the invention finds a preferred application in connection with the coating of radiators, car bodies and automotive accessories, machine components, compressors, shelving units, office furniture and comparable industrial products.

Examples of articles useful for outdoor activities include, but are not limited fishing rods, fishing lures, archery bows, cookware, and so forth.

The method of the present invention is economical, and has minimal impact on the environment.

DETAILED DESCRIPTIONS OF THE PREFERRED EMBODIMENTS

The present invention relates to an improved method of electrostatically coating substrates which have little or no electrical conductivity including, for example, polymeric substrates and polymer composite substrates, wood and wood products, and to an improved surface treatment composition for use therein.

The composition of the present invention suitable for use as surface treatment is desirably a liquid composition including at least one halogen, halogen complex, a halide salt, hypohalite, hypohalate, perhalate, and so forth, or mixture thereof, and a liquid carrier or solvent. Examples of suitable carriers include, but are not limited to, water, alcohol such as ethanol, isopropanol and methanol, acetone, ethers such as diethyl ether, toluene, p-xylene, benzene, carbon disulfide, chloroform, carbon tetrachloride, glycerol, alkaline iodide solutions, and so forth, and mixtures thereof. Some carriers are more preferable than others due to the varying levels of toxicity or environmental concern, with water being a preferred solvent. Water in combination with another carrier, such as an alcohol, is also suitably used.

Any of the halogens find utility herein including iodine, bromine, chlorine, and fluorine. Iodine and chlorine are more suitable for use, with iodine being most suitable.

"Halophors" including bromophors, chlorophors, iodophors, fluorophors, and so forth, also find utility herein. As used herein, the term "halophor" is used to refer to complexes of halogens with solubilizers or carriers which are typically polymers such as polyvinyl pyrrolidone or polyethylene glycol, or certain types of surface active agents including those that have detergent properties. Complexes of halogens are readily known.

The hypohalites include hypochlorite, hypoiodite, hypobromite, hypofluorite, hypoastatite, and mixtures thereof. Hypochlorite is suitably employed due to the fact that it is readily available and economical. The corresponding cation may be an alkali or an alkaline earth metal. Sodium and potassium are suitably employed as cations.

Certain other metal salts may also find utility herein as well including the metal halides, perhalates, hypohalates, and so forth. Some salts may exhibit a tendency to produce a graininess in the result powder coating, thereby resulting in a lower quality powder coating.

In order to eliminate or minimize many of the difficulties involved with using atomic halogens including poor solubility in solvents, complexes of halogens with various materials may be employed. These halogen containing complexes are often referred to as "halophors" and include bromophors, chlorophors, fluorophors and iodophors. The complexes are often prepared either with surfactants including nonionic, anionic, cationic and amphoteric surfactants, or with polymers.

The polymers or surface active agents may act to solubilize the halogen, as described above. Complexes formed using these materials and the halogens are readily known. Suitably, either iodophors or chlorophors are utilized herein. Most suitable for use in the present invention, are the iodophors.

Surfactants useful in forming halophors are known to those of skill in the art. The following discussion includes exemplary surfactants but is not intended to be any limitation on the types of surfactants that may be utilized in the formation of halophors useful herein.

Anionic surface-active agents are less popular in forming halogen complexes because they may not have the stability required for many applications. It may therefore be desirable to use them in combination with another surfactant.

A suitable class of cationic surfactants useful in forming halophors are quaternary ammonium compounds.

The halogens, and in particular iodine may form complexes with nonionic surfactants. Useful synthetic nonionic surfactants are often the condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a water-soluble nonionic surfactant.

Examples of nonionic surfactants useful in forming halophors are known to those of skill in the art and include, but are not limited to, primary and secondary aliphatic alcohol ethoxylates, alkylphenol ethoxylates and ethylene oxide/propylene oxide condensates on primary alkanols, condensates of ethylene oxide with sorbitan fatty acid esters, condensates of ethylene oxide and aliphatic ethers or glycols, and so forth.

Examples of ethylene oxide/propylene oxide condensates useful herein include those having about 50% to about 70% ethylene oxide and nonylphenoxypoly (ethyleneoxy) ethanol and octylphenoxypoly (ethyleneoxy) ethanol.

Nonionic surfactants useful in forming halophors, in particular iodophors, are discussed in U.S. Pat. No. 5,707,955 incorporated by reference herein in its entirety.

Bromophors and iodophors are discussed in U.S. Pat. No. 4,894,241 incorporated by reference herein in its entirety.

Nonionic surfactants, anionic and cationic surfactants for use in halophor formation are described in U.S. Pat. No. 4,206,204 incorporated by reference herein in its entirety.

Probably the most commonly used halophors, in particular, the iodophors, include the halogen complexed with nonionic surfactants, glycol ether, and polyvinylpyrrolidone (1-ethenyl-2-pyrrolidone homopolymer compound). While these are commonly used complexes of halogens, other compounds as described above may be used in the formation of the complexes as well. The titratable halogen, such as the titratable iodine, in such complexes is typically between about 0.5 and 1.5% halogen. It is surmised that a certain amount of halide may also be present in the compositions.

Specific examples of useful iodophors of nonionic surfactants include, but are not limited to polyethoxylated nonylphenol iodine complex and polyethoxylated fatty alcohol iodine complex. In one embodiment, a blend of these two iodophors is utilized.

Surfactants which may find utility in forming halophors are discussed in *McCutcheon's Detergents and Emulsifiers*, 1999, North American Edition, MC Publishing Co. incorporated by reference herein in its entirety.

There are a vast amount of surfactants that may be utilized in the formation of halophors known to those of skill in the art, and a vast amount of references as well. The list above is by no means intended as an exclusive list of surfactants that may find utility herein. Halophors may be readily substituted without departing from the scope of the present invention.

Varying the concentration of the halogen or halogen complex in the liquid carrier will result in different conductivities as well. However, the concentration of halide or halide containing compound may be anywhere from about 0.001% to about 100%, suitably about 0.01% to about 20% halogen or halogen complex, more suitably about 0.1 to about 10%, and most suitably about 0.1% to about 5% halogen or halogen complex.

The composition may be applied to a substrate or article using any method known in the art including, but not limited to, dipping, spraying, brushing, and so forth.

In some embodiments of the present invention, a mixture of an iodine complex in a solvent is employed. A solution of about 12.5% iodine complex is further diluted with water at a ratio of about 13:1 providing a solution of about 1% complexed iodine. In this embodiment, titratable iodine is about 1%. After dilution, titratable iodine is less than about 0.1%. While denatured alcohol was found to be a suitable carrier in this embodiment, water was found to be superior.

The concentration of iodine may be anywhere from 0.001% iodine or iodine complex to about 100% iodine or complexed iodine, suitably about 0.1% to about 10%, and most suitably between about 0.1% to about 5% iodine or complexed iodine. In one particular embodiment, a solution of 12% iodine in water is employed.

The electrostatic charge may be applied to the surface after treatment with the surface treatment solution using any powder coating equipment known in the art such as that made by Nordsen and by Wagner including, for example, a Nordsen 2001 powder coating system or a Wagner EPG 2007 powder coating system. Suitably, a negative charge is applied to the treated surface. An opposite charge may also be applied to the coating composition used in the electrostatic coating process.

As used herein, the term "coating" may refer to any composition which may be electrostatically applied in such a manner, including those compositions which include pigments or dyes, and thus includes those compositions which are employed for electrostatically painting a substrate or article. The present invention is not limited, however, to compositions employed for an electrostatic painting process which compositions include pigments or dyes.

One particular advantage of using the method of the present invention is that the substrates or articles may be electrostatically coated either while "wet", or after drying, or at any point in between. This allows electrostatic coating of the substrate or article immediately after surface treatment. In other words, the present invention in not sensitive to the presence of moisture. This is a surprising result.

The surface treatment composition of the present invention may be used with any electrostatic coating or painting techniques known in the art.

Electrostatic coating of both liquids and powders may be employed in the method. If a liquid coating is employed, any suitable water-based and/or organic-based composition may be employed.

A typical electrostatic coating process involves charging or ionizing a coating and then spraying the coating on a grounded, conductive article. Using the method of the present invention, sufficient conductivity is imparted to the article or substrate by using the surface treatment of the present invention prior to electrostatic coating. The electrostatic attraction between the coating and the grounded article results in a more efficient coating process with less wasted material such as a paint composition, and thicker and more consistent coverage, particularly when the article has a complex shape.

Useful powder coating compositions may include polyester resins, epoxy resins, epoxy-polyester resins, epoxy functional polyacrylate resins, and so forth. Such compositions are available form Spraylat Corp., BASF Corp., and so forth. Examples of such materials are described in U.S. Pat. No. 6,254,751, U.S. Pat. No. 6,133,344, both of which are incorporated by reference herein in their entirety. The composition may also include optional ingredients such as other film formers, binders, crosslinking agents, flow aids, catalysts, devolatilization auxiliaries, dyes, pigments, and so forth.

In the case of paints, a dye or pigment is of course required if it is desirable to impart color to a substrate or article. The present invention is not limited to any particular coating employed in electrostatic deposition and the above examples are for purpose of illustration only.

Powder coatings are typically prepared by mixing the components in a high shear mixer or extruder at a temperature which is above the softening temperature of the film-forming polymer but below the crosslinking temperature and then bringing the resulting extrudate to a particle size of from about 40 to 70 $\mu$m by means of a milling process.

After electrostatic coating, the substrate or article may be placed in an oven at an appropriate heat cure temperature. Typical temperatures for use with a powder coating are in the range of about 150° C. to 200° C., but of course depend on the type of coating used. A commonly used temperature is about 350° F. (about 175° C.). The amount of time required for curing varies, but is typically less than 1 hour.

The present invention finds utility for electrostatically coating any substrates or articles made of materials which have little or no conductivity. In particle, the present invention finds utility for electrostatically coating articles manufactured from polymers, polymer composites, wood and wood products or any other low conductivity surfaces. Wood products generally refer to such materials as fiberboard, particle board, and so forth. Such articles may be made by any method known for forming articles including, but not limited to, molding, thermoforming, extruding, machining and so forth.

Polymeric materials suitable for use include those materials referred to in the art as thermoplastic, elastomeric, thermosetting, and so forth.

Examples of useful thermoplastic materials include, but are not limited to, thermoplastic polyolefin such as polyethylene and polypropylene including high and low density versions, grafted (e.g. maleated) polyethylene and polypropylene, atactic polypropylene, polyvinyl chloride, polymethylmethacrylates, polyvinyl acetate, saturated polyesters, polystyrene, polyacrylates and polymethacrylates, thermoplastic (i.e. saturated) polyurethanes, polycarbonates, thermoplastic polyesters, polyamides, nylons, polyacetals, polysulfones, ethylene-carbon monoxide copolymers, substantially linear interpolymers of ethylene and at least one alpha-olefin such as ethylene-propene, ethylene-butene, ethylene-hexene, ethylene-octene copolymers, and so forth, to mention only a few. The present invention also contemplates the use of any other copolymers and terpolymers of such polymeric materials.

Examples of elastomeric materials include styrene-butadiene-styrene, styrene-ethylene/butylene-styrene, styrene-ethylene/propylene-styrene, styrene-isoprenestyrene, polyisoprene, ethylene-propylene diene rubbers (EPDM), chlorinated rubbers, nitrile rubbers, methylmethacrylate styrene-butadiene block copolymers, polybutadiene, and acrylonitrile-butadiene-styrene copolymers, and so forth, to mention only a few.

Thermosetting polymeric materials include, but are not limited to, unsaturated polyesters, epoxy resins, vinyl ester resins, phenolic resins, polyether, polyester and polyurea urethanes, and so forth. Such materials are commonly crosslinked with styrene, amines, vinyl toluene, hexamethylenetetraamine, and so forth.

Fillers, particulate matter, fibers, and so forth may be used in combination with the polymeric materials including, for instance, glass particles, minerals such as calcium carbonate, dolomite, clays, talc, zinc borate, perlite, vermiculite, alumina trihydrate, solid or hollow glass microspheres, and so forth. Polymer-based fibers may also be used including, for instance, nylon, polyester, polybenzoxazole, aramid, ultra high molecular weight polyethylene fibers, and so forth, to mention only a few.

All of the materials discussed above are for exemplary purposes only and are in no way intended as a limitation on the scope of the present invention. Other materials exist which may be used in accordance with the teachings of the present invention, and are known to those of skill in the art.

Other optional ingredients may be added as well including, but not limited to, thickeners, hardeners, crosslinking agents, initiators, chain extenders, mold release agents, free-radical inhibitors, catalysts, plasticizers, waxes, and so forth. Such ingredients are intended for exemplary purposes only. One of ordinary skill in the art understands that there are numerous additives that may be optionally included in making various articles not listed herein.

The ingredients may be mixed according to any standard procedures known in the art including high shear mixing, upright mixers, extruders, and so forth. The order of addition of ingredients is dependent upon which type of polymer is being used, as well as the ingredients added.

While the present invention is not limited to use on any particular article or substrate, some examples for which the present invention finds utility include, but are not limited to, automobile bodies and automotive accessories, equipment parts and machine components, radiators, compressors, household items and accessories such as furniture and shelving, siding, doors and so forth. Other examples include, but are not limited to, articles for hunting, fishing and camping such as fishing rods, fishing lures, archery bows, cookware, and so forth.

In some embodiments of the present invention, the electrostatic coating process of the present invention is used for hunting, fishing and camping equipment and accessories such as fishing rods, fishing lures, cookware, archery bows, and so forth.

One particular example of an article which may be electrostatically coated according to the present invention is an archery bow limb, such as a compound archery bow limb, made of a polymer composite of an epoxy and glass fibers. Suitably, a coating having a pigment or dye is employed. In this embodiment, the content of glass fibers may be from about 10 wt-% to about 80 wt-%, and more suitably about 50–70wt-%.

The present invention may find utility for any article or substrate which may be electrostatically coated. The above embodiments and descriptions are in no way intended to limit the scope of the present invention. The following non-limiting examples are further illustrative of the present invention.

EXAMPLES

Test Methods

1. Cross-Cut Tape Test

ASTM Test Method D-3359 was used to test the adhesion of the powder coated paint to the substrate.

Example 1

A solution of about 12.37% polyethoxyalated nonylphenol iodine complex and polyethoxylated fatty alcohol iodine complex (providing about 1% titratable iodine) was diluted with water at a ratio of about 13:1 water to iodine. The substrate was a polymeric composite of an epoxy and glass fibers having about 67±2 wt-% glass fibers available form Gordon Composites under the designation of EP-67-UB. The substrate was dipped in the solution. The substrate was suspended from a cable and a negative charge applied using a typical powder painting machine available from Wagner Model # EPG 2007. An application gun was used to apply the positively charged powder paint. The coating may be completed while the substrate surface is still wet, or it may be completed after the substrate has dried.

The part is then placed on a bake rack in a conventional walk-in oven at an appropriate cure temperature of about 175° C. (about 350° F.) for about 17 minutes per specifications. Several paints were used in the example including Spraylat PELT1956C Black Epoxy, PPLT 1752K Neon Blue Polyester, PPLT1511 Turf Green Polyester, PPLT1450K Traffic Purple Polyester, PPLT13362 Yellow Polyester, PPLT1451K Red Baron Polyester.

The substrate was then removed from the oven, allowed to cool and checked for proper adhesion using an ASTM D-3359 cross hatch test.

What is claimed is:

1. A conductivity inducing surface treatment composition applied to a substrate having poor electrical conductivity comprising at least one member selected from the group consisting of halophors of nonionic surfactants; halophors of amphoteric surfactants; iodophors, chlorophors and bromophors of anionic surfactants; halophors of glycol ether or polyvinylpyrrolidone; hypohalites; hypohalates; perhalates; iodine, chlorine, bromine, fluorine; and mixtures thereof.

2. A conductivity inducing surface treatment composition applied to a substrate having poor electrical conductivity wherein said surface treatment composition comprises a halogen complex which is an iodophor of a surface active agent.

3. The conductivity inducing surface treatment composition of claim 2 wherein said surface treatment composition comprises an iodophor of polyethoxylated nonylphenol, an iodophor of polyethoxylated fatty alcohol or a mixture thereof.

4. The article of claim 2, said article further comprising an electrostatic coating.

5. An article formed of a substantially nonconductive material wherein said article is pretreated with a surface treatment composition comprising at least one member selected from the group consisting of halophors of nonionic surfactants; halophors of amphoteric surfactants; iodophors, chlorophors and bromophors of anionic surfactants; halophors of glycol ether or polyvinylpyrrolidone; hypohalites; hypohalates; perhalates; iodine, chlorine, bromine, fluorine; and mixtures thereof, and electrostatically coated.

6. The article of claim 5 wherein said halogen salt is an alkali metal or alkaline earth metal halide salt, hypohalite, hypohalate, or perhalate.

7. The article of claim 5 wherein said surface treatment composition is a hypohalite.

8. The article of claim 7 wherein said hypohalite is sodium hypochlorite.

9. The article of claim 5 wherein said article is a fishing rod, fishing lure, archery bow, automobile body, automobile accessory, siding, furniture, shelving, door, cookware or appliance.

10. An article pretreated with a surface treatment composition comprising at least one halogen complex which is an iodophor and electrostatically coated.

11. The article of claim 10 wherein said iodophor is an iodophor of polyethoxylated nonylphenol, an iodophor of polyethoxylated fatty alcohol or mixture thereof.

12. A conductivity inducing surface treatment composition applied to a substrate, said conductivity inducing surface treatment comprising at least one halogen, a halogen salt, a halogen complex or mixture thereof wherein said halogen is iodine.

13. An article formed of a substantially nonconductive material wherein said article is pretreated with a surface treatment composition comprising at least one member selected from the group consisting of halophors of nonionic surfactants; halophors of amphoteric surfactants; iodophors, chlorophors and bromopbors of anionic surfactants; halophors of glycol ether or polyvinylpyrrolidone; hypohalites; hypohalates; perhalates; iodine, chlorine, bromine, fluorine; and mixtures thereof.

14. A conductivity inducing surface treatment composition applied to a substrate having poor electrical conductivity comprising at least one member selected from the group consisting of iodophors nonionic surfactants, iodophors of amphoteric surfactants; iodophors of cationic surfactants; iodophors of anionic surfactants; iodophors of glycol ether, iodophors of polyvinylpyrrolidone, and mixtures thereof.

15. The conductivity inducing surface treatment composition of claim 14 comprising at least one member selected from the group consisting of iodophors of nonionic surfactants; iodophors of glycol ether; iodophors of polyvinylpyrrolidone; and mixtures thereof.

* * * * *